(12) United States Patent
Bedells et al.

(10) Patent No.: US 6,531,254 B1
(45) Date of Patent: *Mar. 11, 2003

(54) PROCESS FOR MAKING PARTICULATE COMPOSITIONS

(75) Inventors: Alison Dawn Bedells, Manchester (GB); Daniel Patrick Morris, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,548

(22) PCT Filed: Mar. 23, 1999

(86) PCT No.: PCT/GB99/00917

§ 371 (c)(1),
(2), (4) Date: Oct. 2, 2000

(87) PCT Pub. No.: WO99/50714

PCT Pub. Date: Oct. 7, 1999

(30) Foreign Application Priority Data

Apr. 1, 1998 (GB) .............................................. 9806934

(51) Int. Cl.⁷ ............................ G03G 9/087; C08J 3/16
(52) U.S. Cl. ................................ 430/109.3; 430/110.4; 430/137.14; 523/333; 523/335
(58) Field of Search ................... 430/137.14, 137.16, 430/137.17, 137.19, 137.2, 109.1, 109.3, 137, 114, 137.22, 110.4; 523/205, 215, 333, 334, 335, 339

(56) References Cited

U.S. PATENT DOCUMENTS

| | | | | |
|---|---|---|---|---|
| 3,634,251 A | * | 1/1972 | Maeda et al. ............. | 430/109.3 |
| 3,999,654 A | * | 12/1976 | Pollack ........................ | 206/216 |
| 4,950,574 A | * | 8/1990 | Kumagai et al. ......... | 430/109.3 |
| 5,525,452 A | | 6/1996 | Hopper et al. | |
| 5,645,968 A | | 7/1997 | Sacripante et al. | |
| 5,985,502 A | * | 11/1999 | Ayaki et al. ............. | 430/109.3 |

FOREIGN PATENT DOCUMENTS

| | | |
|---|---|---|
| EP | 0 302 939 | 2/1989 |
| EP | 0 609 443 | 8/1994 |
| EP | 0 622 686 | 11/1994 |
| GB | 2 305 926 | 4/1997 |
| WO | WO 98/50828 | 11/1998 |

OTHER PUBLICATIONS

Diamond, A.S., ed. *Handbook of Imaging Materials*, Marcel Dekker, Inc., NY (1991), pp 160–162.*

* cited by examiner

Primary Examiner—Janis L. Dote
(74) Attorney, Agent, or Firm—Pillsbury Winthrop LLP

(57) ABSTRACT

There is described a process for producing a particulate composition comprising the steps of:

(a) forming a first dispersion comprising first particles stabilized in a first fluid by first species;

(b) optionally the step of forming a second dispersion comprising second particles stabilized in a second fluid, miscible with the first fluid, by second species;

(c) after (or simultaneously with) the optional step of mixing the first and second dispersions together if the second dispersion was formed from step b); inducing association between the dispersed particles to form clusters; and (d) binding together the particles within the clusters; characterized in that the first and/or second particles comprise at least one polar functional group to facilitate the binding of the particles in step (d).

Preferably the polar group is other than an acid group, more preferably comprises at least one hydroxy group, non-acidic polar group and/or non-basic polar group, most preferably comprises one or more hydroxy and/or ether groups (e.g. an optionally polymeric alkylene glycol alkyl ether).

6 Claims, No Drawings

PROCESS FOR MAKING PARTICULATE COMPOSITIONS

The present invention relates to a process for making particulate compositions. Such compositions have particular utility in the field of electroreprography. Preferred aspects of the invention relates to processes for making toner compositions for use in electroreprography.

Electroreprography is any process in which an image is reproduced by means of electricity and incident radiation, usually electromagnetic radiation more usually visible light. Electroreprography comprises the technology of electrophotography which encompasses photocopying and laser printing technologies. In both these technologies a latent electrostatic image in charge is produced by exposure of a photoconductive drum to light. This can be either reflected light from an illuminated image (photocopying) or by scanning the drum with a laser usually under instruction from a computer (laser printing). Once a latent image has been produced in charge it must be developed to form a visible image on the drum which can then be transferred onto a suitable substrate so a hard copy of the image is obtained (e.g. by printing onto paper).

Suitable developers, which may be liquid or dry compositions, comprise particles of a toner which are electrostatically attracted to the latent image. Liquid developers comprise a toner dispersed in a suitable insulating liquid. Dry developers may comprise single component systems comprising a toner, or two component systems which comprise a mixture of a toner and a carrier. A toner may comprise particles of a polymeric component, a colouring agent and optionally other internal and/or external additives such as charge control agents and/or surface additives to improve the flowability of the toner particles. The polymeric component of the toner is electrically insulating to enable the toner to be electrostatically charged during the electroreprographic process and also acts to fix the toner to the printed substrate, usually by fusion of the polymer onto the substrate by heating. The colouring agent, which is usually a pigment, imparts the required colour to the toner.

During use in an electroreprographic device, friction between particles of toner with their carrier and/or with parts of the device in which the toner is used cause the toner particles to become charged with an electrostatic charge (tribocharge). The exact mechanism to produce the toner image will then vary according to the specific device used. For example in a conventional photocopier the toner composition may be formulated so that tribocharged toner particles will be opposite in sign to the latent image on the drum and toner will be attracted to the latent image on the drum to develop an image in toner on the drum which corresponds to the original document. The developed image is then transferred to a substrate such as paper (e.g. by a pressure roller and/or voltage). The transferred image is fixed to the substrate (e.g. by heat, pressure and/or suitable solvents) to produce a hard copy of the image. The image drum is then cleaned and the device is ready to produce the next copy. Thus developer compositions are used both to develop the latent image on the drum and to produce the final hard copy.

There are a number of methods for making toners. The most common method is to mix the polymer and optional other ingredients (e.g. colorant) together by kneading in a ball mill above the melting point of the resin. The optional ingredients may be added simultaneously or sequentially to the resin before or after melting the resin, but are generally added to the resin when molten. Generally, this involves mixing the molten composition for several hours at temperatures from 120° C. to 200° C., in order to uniformly distribute any optional ingredients (if present) throughout the toner resin. The resultant melt may then be cooled, extruded and then formed into particles with a mean diameter of typically below 20 $\mu$m. The particle formation is achieved by physical processes such as crushing, grinding, milling, and/or pulverising the extrudate. The fine powder of colour toner or toner-resin so obtained is either used directly, is diluted with an inert solid as carrier and/or is coated with surface additives such as silica by mixing for example in a suitable blending machine.

As well as being extremely energy intensive, such physical processes result in a wide distribution of particle sizes within the toner. This leads to significant disadvantages. A wide particle size range generates more uneven tribocharge within the toner which leads to an uneven print density in the final image. The fine dust within such toner compositions leads to fogging of the image produced and more readily contaminates the interior of the device in which the toner is used. The larger particles reduce the resolution of images developed with the toner. Methods for classifying this wide particle size (such as air classification or sieving) are wasteful as material outside the required size range is recycled which adds to the cost.

Modem electroreprographic devices require toners which avoid some or all of the preceding disadvantages and have some or all of the following properties: low temperature at which the toner image fixes onto the printed substrate; wide temperature range over which fusion of the toner occurs; low contamination of the device in which it is used; ability to generate tribocharge at a controlled level, which is stable with time and which is reasonably independent of either temperature or humidity; small particle size (preferably <7 $\mu$m) with narrow size distribution to provide good image resolution; cheap to produce in large volumes; uniform dispersion of colorant(s) and other additives [e.g. charge control agents (CCAs) and waxes]; ability to produce matt or gloss images as required; high optical density; wide colour gamut; and/or resistance to smudging and smearing in the final image. These properties are strongly influenced by the choice of toner resins. It is not feasible or cost effective to produce a toner having these parameters using the conventional extrusion and milling processes described above.

Therefore to overcome these disadvantages, methods for chemically producing toners have been developed in which the toner particles are prepared by chemical processes such as aggregation or suspension rather than abraded from much larger sized material by physical processes. Chemically produced toners made by prior art suspension methods are less satisfactory as it is difficult to control particle shape or obtain a narrow distribution of particle size using such methods. Aggregation processes are preferred as they provide a greater degree of control of the properties of resultant toner particles such as size distribution, particle shape and/or particle composition.

Certain prior art applications (for example JP 2-259770, JP 2-259771, JP 2-11968, JP 2-061650 and JP 2-093659 [Kokai] and U.S. Pat. Nos. 4,983,488, 5,066,560 and EP 0162577 all to Hitachi) disclose methods for chemical production of toners using an irreversible coagulation method for particle growth. JP 2-061650 is typical of these and describes mixing aqueous dispersions of latex and a pigment followed by a coagulation step. These Hitachi patents all describe use of coagulating agents, such as suitable salts, which reduce the stability of the colloid irreversibly.

The mechanism of the Hitachi processes is as follows. In a colloid stabilised by charged surfactants, surrounding each dispersed particle in the continuous (typically aqueous) phase there will be a so called 'double layer' where counter ions (of opposite charge to the net charge on the particle) will be in excess. The degree to which the counter ions are in excess will decrease with increasing distance from the dispersed particle. The thickness of this double layer will be determined by the rate at which the net charge decreases with distance from the particle which is dependent on inter alia the ionic strength of the colloid. The colloid will only be stable whilst the ionic repulsion between these double layers keeps the dispersed particles a sufficient distance apart for short range attractive forces (such as van der Waals forces) not to be significant. If the double layer is too thin the dispersed particles can approach sufficiently closely for these attractive forces to predominate. Thus altering the ionic strength of the colloid will effect the thickness of the double layer and hence the stability of the colloid. When the ionic strength is raised to a particular amount the double layer is so thin there is effectively no ionic repulsion between particles and the forces between the particles are purely attractive which leads to the formation of a large solid mass. Hence adding a suitable ionic salt to a colloid (so called salting out) at a certain concentration will suddenly produce an irreversible, collapse of the dispersed particles into a distinct mass.

EP 0225476, EP 0609443, EP 0302939, all in the name of Nippon Carbide, describe various processes for chemically producing toners in which aggregation is induced (for example by heating).

Various patent applications all in the name of Xerox (e.g. EP 0631196, EP 0631057, EP 0631197, EP 0631194, EP 0671664, EP 0631195, GB 2279464, GB 2279465 and GB 2269179) describe modifications of a process for chemically producing toners in which dispersions stabilised with opposite charged surfactants are mixed together to start aggregation. Typical of these applications is EP 0631196 (Xerox) which describes a process for preparing a toner by aggregation of a mixture of an aqueous suspension of a pigment stabilised with ionic surfactant and an aqueous suspension of a latex stabilised with an ionic surfactant of opposite charge to that stabilising the pigment. The oppositely charged surfactants cause the pigment and latex particles to associate into clusters of particles immediately the dispersions are mixed. The clusters are grown by heating. Once the desired cluster size has been reached further aggregation is minimised by adding additional surfactant to stabilise the suspension of clusters. Then the particle clusters are fused together by heating the mixture above the glass transition temperature ($T_g$) of the latex to form irregularly shaped toner particles comprising pigment and latex which can be collected.

In these processes the different dispersed particles begin to associate as soon as the dispersions mix. The amount of association is controlled by the ratio of cationic to anionic functionality between the two surfactants which must be balanced with the required ratio of the two different particle components. The ratio of the two surfactants must be chosen carefully to ensure that the correct amount of mixing of the ingredients can occur.

In the prior art processes after the dispersed particles are associated and grown into clusters; the clusters of particles must be bound internally to from fused irregularly shaped matrices (which are suitable for use as toners). The binding step is often difficult and energy intensive in the prior art methods. It is an object of the present invention to provide an improved process for chemically producing particulate compositions, such as toners.

The present invention relates to improved processes for producing particulate compositions (such as chemically produced toners) in which fusion of the associated particles is more readily achieved. Surprisingly the applicant has discovered that if the particles comprise a polar functional group, especially a hydroxy functional group the fusion step can be achieved more readily.

Therefore broadly in accordance with one aspect of the present invention there is provided a process for producing a particulate composition comprising the steps of:
  (a) forming a first dispersion comprising first particles stabilised in a first fluid;
  (b) optionally the step of forming a second dispersion comprising second particles stabilised in a second fluid, miscible with the first fluid;
  (c) after (or simultaneously with) the optional step of mixing the first and second dispersions together if the second dispersion was formed from step b); inducing association between the dispersed particles to form clusters; and
  (d) binding together the particles within the clusters; characterised in that the first and/or second particles comprise at least one polar functional group.

The applicant has discovered that when the particles from steps (a) and/or (b) comprise a polar functional group this facilitates the binding of the particles in step (d) (for example by controlling fusion e.g. by heating). Preferably the polar group comprises other than an acid and/or basic polar group, more preferably comprises at least one hydroxy group, non-acidic polar group and/or non-basic polar group, most preferably comprises one or more hydroxy and/or ether groups (e.g. PEG functionality and/or alkylene glycol alkyl ether).

If the particles from steps (a) and/or (b) comprises one or more polymers it is advantageous if at least one of such polymers comprise polar groups (preferably those described above) to control the particle binding in step (d). In particular the polymer which may be a homo or co polymer may comprise hydroxy or other polar functional groups. A preferred hydroxy-functional polymer is an hydroxy functional latex copolymer optionally prepared by emulsion polymerisation. Preferred polar-functional polymers, which do not comprise an hydroxy group, yet which are also suitable for controlling fusion comprise: polymeric alkylene glycol alkyl ethers: for example poly(ethylene glycol) monomethyl ether acrylate and/or methacrylate; and/or poly(propylene glycol) monomethyl ether acrylate and/or methacrylate.

Copolymers may be prepared by copolymerising (e.g. by emulsion polymerisation) an hydroxy-functional and/or other polar-functional polymer precursor (preferably a monomer) with other polymer precursors (e.g. other monomers) to form particles of copolymer (e.g. copolymers of stryene, butyl acrylate and an hydroxy functional monomer). Preferably the hydroxy functional monomer is present in the copolymer in an amount from about 0.1% to about 10% w/w, preferably from about 1 to about 5% w/w to be useful for controlling the fusion process. Suitable hydroxy-functional polymers and/or polymer percursors for making them comprise: 2-hydroxyethyl acrylate and/or methacrylate; hydroxypropyl and/or hydroxybutyl acrylates and/or methacrylates; poly(ethylene glycol) mono acrylates and/or methacrylates; and/or poly(propylene glycol) mono acrylates and/or methacrylates.

The advantage of using polar functional particles (preferably hydroxy-functional copolymers) in the process of the present invention is to control the fusion process. In step (c) particles of non-functional polymers associate and grow well. They also fuse easily, in the sense that coalescence occurs readily. However with such polymers it is more difficult to maintain the particle size distribution, as "gritting" occurs. Very high levels of polar functionality (e.g. >10%) give good particle size stability, but the coalescence rate may be low. Intermediate levels of such functionality (from about 2% to about 10%) are found to give good particle size control and adequate coalescence rates.

Unless the context clearly indicates otherwise, as used herein plural forms of the terms herein are to be construed as including the singular form and vice versa.

Preferably the particulate composition produced by the above method is electroreprographically effective. More preferably the above process produces a composition which (optionally after further finishing steps) can be used as a toner and/or developer composition for an electroreprographic imaging device. The term 'electroreprographically effective' (for example with reference to the toners, compositions, ingredients and/or processes described herein) will be understood to mean effective for use in an electroreprographic method by for example: providing the required properties to a toner and/or developer, being compatible with any inert carriers and/or diluents suitable for formulating such toners and/or developers (for example those described herein), being compatible with electroreprographic devices (such as photo-copiers and/or laser printers) and/or being capable of being printed in such devices. Preferably to be acceptable for use in electroreprography ingredients are Ames negative.

Although the particulate compositions produced by the process of the invention have particular utility as toners for use in electroreprography, they may also be useful where compositions comprising small particles of narrow size distribution add known chemical composition would also be advantageous, for example in catalysis.

In step c) optionally, after association has occurred for a selected period, further association between the particles may be substantially inhibited. Preferably the association in step (c) comprises aggregation, flocculation and/or coagulation.

Optionally the processes of the present invention may also comprise the following additional growth process in step c):

(i) inducing, optionally by heating and/or agitation, growth of the clusters formed by association into dispersed matrices of loosely associated clusters; and (ii) optionally once the desired matrix size has been achieved, substantially reducing further growth by suitable means, for example by adding non-ionic and/or ionic surfactant and/or changing pH.

Preferably the polar group forms part of the particles' surface. The polar group may be directly bonded to the surface (e.g. by forming part of the material [such as a Rhmer] from which the particle is formed. The polar group may also be more loosely associated with the particle surface (e.g. by absorption, adsorption, physisorption and/or chemisorption to the surface such as a suitable surfactant.

Preferably in the process of the present invention (the steps labelled as above) preferred features comprise:

(a) forming a first dispersion comprising first particles stabilised in a first fluid;

(b) optionally forming a second dispersion comprising second particles stabilised in a second fluid, miscible with the first fluid;

(c) substantially inducing association between the particles to form clusters;

(d) heating the mixture at a temperature which causes the particles within each cluster substantially to fuse together; and the additional step of (e) collecting the fused clusters to form a particulate composition.

Thus in this preferred aspect of the present invention the particles may be stabilised by surfactant.

A further optional step between steps b) and c) above comprises mixing the first and optionally second dispersions to obtain a substantially homogeneous mixture without substantial association in which the first and second particles are substantially inhibited from associating (e.g. by surfactant).

A still further optional feature after mixing the dispersion from steps a) and b) is that the resultant mixture may be heated to a higher temperature to aid homogeneous dispersion of the mixture. In such a case growth may occur in step (c) without further heating but simply by mixing of the particle dispersion. If the dispersed particles comprise polymers the mixing temperature may be substantially about or above the glass transition temperature (Tg) of any constituent polymers. Thus for example in the preferred methods described below the first and second dispersions (e.g. pigment and latex dispersions) are mixed after having been heated to the growth temperature, or just below. Preferably this mixture in step 'c)' is stirred and heated at a temperature in a range from about 30° C. below to about 30° C. above (preferably about ±20° C., more preferably about ±10° C.) the $T_g$ of any constituent polymers (e.g. the latex) substantially to induce growth of the pigment/polymer clusters particles to form matrices. The temperature of the mixture in step (c) will preferably be in the range from about 30° C. to about 80° C.

The advantage of heating is that the viscosity of the associated mixture never reaches too a high level. The reasons for this are not known. However, without wishing to be bound by theory, it may be because at a higher mixing-temperature some cluster growth occurs during association; and/or perhaps because the viscosity of the gel is lower at higher temperature.

A further preferred aspect of the present invention (the steps labelled as above) comprises:

(a) forming a first dispersion comprising first particles dispersed in a first fluid, stabilised by a first surfactant;

(b) optionally forming a second dispersion comprising second particles dispersed in a second fluid, miscible with the first fluid, stabilised by a second surfactant;

(c) mixing the first and optionally second dispersions to obtain a substantially homogeneous mixture without substantial association; and reducing the stability of the dispersed particles in the homogenised mixture, substantially to induce association between the particles to form clusters.

A preferred process of the present invention uses hydroxy functional polymers to produce a coloured toner composition. Thus this process (the steps labelled as above) further comprises:

(a) forming a first aqueous dispersion comprising pigmentary particles;

(b) forming a second aqueous dispersion comprising polymer particles, the polymer comprising an hydroxy functional group;

(c) mixing the first and second dispersions to obtain a substantially homogeneous mixture in the absence of substantial association, forming clusters by inducing the particles to associate; and then inducing growth of the clusters into dispersed matrices of loosely associated clusters;

(d) heating the reaction mixture from step 'c)' at a temperature above the glass transition temperature of the constituent hydroxy functional polymer to fuse together the clustered particles to form internally coalesced particles of a coloured toner; and (e) collecting the coloured particulate toner obtained from step 'f)' to produce, after optional washing, drying and/or blending with other suitable ingredients, a coloured toner composition.

The first and second surfactants may optionally be the same.

The processes of the present invention produces particulate compositions having particles with a size distribution which is readily controllable and lies within a narrow range. The present processes avoid the need for further energy intensive milling or classification steps. The processes allow precise control over the final particle size and produce small particles, economically in good yield with a low level of fines. Such small particles are ideal for use in toners where small particles are desirable for producing images of improved resolution. Toner compositions produced by the processes of the present invention may be any colour including black.

An optional step between step c) [growth of the particles into clusters] and step d) [fusion of the particle clusters] is stabilising the particle size distribution before raising the temperature to effect fusion. One method is to add extra surfactant which may be ionic or non-ionic.

It is desirable to remove any surfactant which may remain on the particles as otherwise the tribocharge level of the resultant toner is likely to be humidity dependant.

Preferably the process of the present invention directly produces toner particles substantially having a diameter from about 2 $\mu$m to about 20 $\mu$m, more preferably from about 3 $\mu$m to about 15 $\mu$m, most preferably from about 5 $\mu$m to about 10 $\mu$m. Preferably 80% of the particles fall within the preceding size ranges, more preferably 90%, most preferably 95%. Toner with a mean particle size of 5 $\mu$m or below may have particular utility for high resolution printing.

The particle size given herein is a linear dimension corresponding to the diameter of a sphere approximately of same volume as the particular particle of interest which may be substantially irregular in shape.

It can be seen therefore that the process of the present invention provides a high degree of flexibility in the choice of resin components and colorants as a wide variety of combinations of surfactants can be used. The present invention can use any suitable method to induce and inhibit particle association, for example those aggregation, flocculation and/or coagulation methods taught in the prior art described herein. The particle dispersants can be stabilised and de-stabilised by any suitable means for example by surfactants (which may be non-ionic or ionic). This provides a means for more exactly controlling the particle size distribution, which can be readily and inexpensively optimised for the ingredients used and the properties desired in the final toner product. A preferred method is that described in the applicant's co-pending British application GB 9708815.7.

The dispersion of pigmentary particles in step 'a)' may consist only of a dispersion of pigment; or may comprise a mixture of pigment and polymer for example as produced by one of more of the following methods. The colorant comprising the pigmentary particles may be any colour including black, and may comprise dye(s) [which are substantially soluble in the medium to which they are added] and/or pigment(s) [which are substantially insoluble in the medium to which they are added].

An aqueous dispersion of pigmentary particles may be produced by a solution dispersion process in the following way. A polymer (e.g. polyester) is dissolved in an organic solvent. Any solvent which is immiscible with water, which will dissolve the polymer and which can be removed by distillation relatively easily could be utilised. Suitable solvents comprise xylene, ethyl acetate and/or methylene chloride. To this solution is added a colorant either a pigment or a dye. If a dye is used this is simply dissolved in the polymer solution to produce a coloured liquid solution. If a pigment is used it may be added, preferably with one or more suitable pigment dispersants (which may be ionic or non-ionic) and the pigment is milled in the polymer solution to produce a coloured liquid dispersion. Other optional additives such as charge control agents and waxes may be added to the liquid (either dissolved or dispersed in the solvent).

Where transparency is desirable, for example where the toner is used to produce an optionally coloured image on a clear substrate through which light is projected (such as in printing onto transparencies for use on an overhead projector) it is desirable that the toner comprises small sized particles of pigment within the toner. Therefore to produce such transparent toners the particles in the pigment dispersion may be of low particle size (preferably with a mean particle size diameter of less than about 300 nm).

The coloured liquid is added to an aqueous solution comprising the surfactant and is mixed thoroughly (e.g. under high shear) to generate an emulsion. It will be appreciated that the surfactant may be supplemented by further optional stabilising species. The emulsion comprises a dispersed phase comprising droplets of the coloured organic liquid (e.g. particles of solid pigment dispersed in the polymer solution) dispersed within the continuous aqueous phase of the emulsion. Preferably the droplets formed have a diameter of particle size from about 0.1 $\mu$m to about 3.0 $\mu$m. The droplets of coloured organic liquid are stabilised in the aqueous phase by the first ionic species.

The organic solvent is then removed from the dispersed phase by distillation to leave an aqueous dispersion of pigmentary particles containing the colorant dispersed or dissolved within the solid polymer, the dispersed phase being stabilised in the aqueous phase by the first ionic surfactant. The dispersed pigmentary particles can be used as the raw material in step a) and preferably have a particle diameter of from about 60 nm to about 2 $\mu$m, more preferably from about 100 nm to about 2 $\mu$m. The size of the pigmentary particles may be controlled by the amount of ionic species and the degree of mixing of the emulsion.

The dispersion of pigmentary particles in step 'a)' may also be prepared by emulsion polymerisation to form a latex (e.g. using a mixture of stryene and acrylic monomers). The colorant may be incorporated into the latex in various ways, for example by any of the following and/or combinations thereof. An aqueous dispersion of pure pigment and/or pigmented or dyed polymer (produced by the solution/dispersion process described above) may be used as the seed for polymerisation. Alternatively a dye (optionally dissolved in a solvent) may be added to the latex followed by heating. Another method is to perform the emulsion polymerisation in the presence of a dye which preferably is co-polymerisable with the monomers used to form the latex.

Optionally any of the coloured polymer particles made as described above can be self agglomerated alone without the polymer dispersion in step 'b)'.

Preferably the polymer dispersion in step 'b)' comprises an hydroxy functional latex, which may be colourless, formed by a conventional emulsion polymerisation process (e.g. using a mixture of stryene and acrylic monomers). Several emulsion polymers can be made, for example those with different molecular weight distributions, and these can then be blended prior to use of the blend in the aggregation process of the invention.

One advantage of the mixing two dispersions and then associating is that toner particle can be obtained with a wider range of polymeric and other ingredients prepared in each dispersion, that may otherwise be incompatible or difficult to formulate in the same toner resin. For example polymers prepared by the solution/dispersion method preferred for step a) [described herein] may not be readily prepared by the emulsion polymerisation method preferred in step b) and vice versa. Using a mixture of polymers also gives greater opportunity to adjust the properties of the final toner, which are strongly influenced by the choice of polymer(s).

The particles may be collected in step g) by any convenient conventional method for example centrifugation, micro-filtration, freeze drying or spray drying.

In principle the association step c) could be carried out in the same vessel in which dispersions from steps a) and b) are initially mixed, provided the vessel is equipped with both a high shear mixer and a bulk agitator. In practice, two methods are preferred, the "circulation" system and the "single pass" system.

In the "circulation" system the mixture of the dispersions from steps a) and b) (optionally heated to around the polymer Tg, see below) are pumped in a loop from the stirred tank past an external high shear mixer and back into the reaction vessel. Particle association is effected by adjusting the pH by adding acid (or base) into the stream just before the high shear head and/or reaction vessel.

In the "single pass" method the mixture of the dispersions from steps a) and b) are pumped from one (optionally heated) reaction vessel to another reaction vessel past the high shear head. The pH is adjusted by adding acid (or base) simultaneously at the required rate, again just before the shear head and/or reaction vessel.

A further aspect of the present invention comprises particles obtained and/or obtainable by any of the processes of the present invention as described herein. Preferably particulate compositions of the present invention comprise those which are electroreprographically effective (e.g. toner and/or developer compositions). Preferred toners exhibit the particles sizes described herein. Preferred developers further comprise an electroreprographically effective, inert carrier and/or diluent (for example those described herein). The carrier and/or diluent may comprise particles of a size substantially in the range from about 20 $\mu$m to about 100 $\mu$m.

A still further aspect of the present invention provides an electroreprographic device (e.g. a device for colour and/or black and white printing such as a photocopier, laser printer and/or fax machine), a component for said device and/or a consumable useable with said device; any of which comprise a composition obtainable by any of the processes of the invention as described herein.

Compositions of the present invention may exist sealed within an electroreprographic device and/or any component thereof (e.g. spare part and/or replaceable mechanical element) which may or may not be sold separately from the whole device. More commonly, compositions of the present invention are sold separately from the devices and other components thereof as a consumable for use in the device. Consumables useable with these devices may comprise cartridges comprising toners and/or developers of the present invention which may be liquid and/or solid. The cartridges may be sealed, disposable cartridges (which are pre-filled and used once) or may be re-fillable, re-cyclable cartridges (which can be emptied and/or filled by the user and/or sent to the manufacturer of the device or a third party for re-filling). The cartridges may be removable (wholly or in part) from the device; may be shaped to fit in a particular device or a generic device; and may also comprise other parts of the mechanism of the device in which they are used. The cartridges may comprise a single storage compartment for dispensing monochrome toner (e.g. black) or may comprise a plurality of storage compartments for use in devices which can print partial or full colour images. Thus a cartridge with four compartments may dispense a three colour trichomat plus black. Less commonly a cartridge with three compartments may suffice if the black is to be formed by combining the three colours of the trichromat.

A yet further aspect of the present invention provides use of a composition obtainable as described herein, in the manufacture of a electroreprographic device, as a component for said device and/or as consumable for use with said device.

Toners of the present invention preferably comprise a resin as a binder. The terms resin and polymer are used herein interchangeably as there is no technical difference between them. Other ingredients which optionally may be added to a toner compositions comprise one or more of the following and any suitable mixtures thereof: colorant(s), magnetic additive(s), charge control agent(s), wax(es) and/or additive(s) to improve the flow, charge, fusing and/or transfer properties of the toner and/or to aid cleaning of the device (e.g. image drum) in which the toner is used.

In addition to the hydroxy functionalised resin used herein the toner resin may comprise any other thermoplastic resin suitable for use in the preparation of toner compositions. Preferably the toner resin comprises one or more of the following: a styrene and/or substituted styrene polymer, (such as homopolymer [for example polystyrene] and/or copolymer [for example styrene-butadiene copolymer and/or styrene-acrylic copolymer {e.g. a styrene-butyl methacrylate copolymer and/or polymers made from stryene-butyl acrylate and other acrylic monomers such as hydroxy acrylates or hydroxy methacylates}]); polyesters (such as specially alkoxylated bis-phenol based polyester resins [for example those described in U.S. Pat. No. 5,143,809]), polyvinyl acetate, polyalkenes, poly(vinyl chloride), polyurethanes, polyamides, silicones, epoxy resins and phenolic resins. The toner resins may be optionally cross-linked (e.g. to provide the required melt rheology). Therefore multi-functional monomers may be added (e.g. during polymerisation) to the toner resin to make cross-linked polymer particles (e.g. monomers such as di- or tri-functional acrylates or methacrylates and/or divinylbenzene can be added to a styrene-acrylic copolymer). Chain transfer agents may be added to the toner resin to reduce the molecular weight (e.g. thiols can be added to stryene-acrylic resins). The toner resins may also be modified (e.g. at any suitable time before, during and/or after polymerisation) by other conventional methods well-known to a polymer chemist to achieve particularly desired properties. Further examples of the aforementioned resins and other resins also effective for use in toners are given in the book "Electrophotography" by R. M. Shafert (Focal Press) and in the following patents or patent applications: GB 2,090,008, U.S. Pat. Nos. 4,206,064 and 4,407,924. It is especially preferred that the toner resin is compatible with any optional colorant used so it is easier to formulate in such resins and produce clear, durable and bright reprographic images. Preferably, the resin has a melting temperature between about 120° C.

and about 220° C. and more preferably between about 140° C. and about 180° C. However certain resins (e.g. some resins used for coloured toners) may have a lower melting temperature.

The term colorant as used herein encompasses both dyes (which are substantially soluble in the medium to which they are added) and pigments (which are substantially insoluble in the medium to which they are added). A colorant comprises any material which is imparts colour to a medium by any mechanism, for example by attenuation, absorption, reflection and/or scattering of radiation in the region of the electromagnetic spectrum visible to the human eye. Colour as used herein encompasses black, white and greys as well as hues such as red green and blue. For example colour can arise by chemical processes (e.g. absorption, re-radiation, phosphorescence and/or fluorescence), physical processes (e.g. scattering of radiation by particles similar in size to the wavelength of the incident radiation) and/or by any other processes. The terms colorant and colour as used herein unless the context indicates differently also includes materials which have their effect in the region of the electromagnetic spectrum which is non-visible to the human eye (such as infra red or ultra-violet radiation) and which might have application in the electroreprographic area such as for optionally invisible markers in security applications (e.g. currency and security marking).

The colorant may where appropriate [e.g. within the pigmentary particles of step 'a)'] comprise a dye (soluble in the medium to which it is added) and/or a pigment (insoluble in the medium to which it is added). Dyes may comprise disperse dyes which are dispersible in one solvent (e.g. water) but which become soluble in another (e.g. the resin on fusion of the toner particle). For toner applications either dyes or pigments may be used, each having different advantages. Some of the advantages of using dyes over pigments to provide colour in toners comprise any of the following: less quantities of dye are required; there is less likely to be a negative influence on tribocharging efficiency; more brilliant colours can be obtained leading to better colour mixing and a wide colour gamut; a typical absorbance/reflectance spectra of a dye comprises sharp narrow peaks; the images produced are less grainy; the melting point and/or viscosity of toners may be lower; dyes may be chemically modified to alter toner properties; and dyes may be easily purified. Some of the advantages of using pigments over dyes to provide colour in toners comprise any of the following: little bleeding or blooming problems in the image; improved light and solvent fastness; higher thermal stability; high extinction coefficients especially for particles below 100 nm in diameter; and greater chemical inertness. One of the advantages of the process of the present invention is that toner particles can be readily produced which comprise both dye(s) and pigment(s) with the advantages of both colorants. Alternatively as a greater variety of different colorants can be used in the present process the specific colorant(s) chosen can be selected to optimise more exactly the properties of a toner for a specific use.

Preferably toners comprise suitable colorants, such as pigments, for example if the toner is black (for producing black and white images) a suitable colorant may comprise carbon back. Coloured toners (e.g. for use in colour copies and colour laser printers) may comprise a trichromatic set of toners, each toner in the trichromatic toner set preferably comprising a toner resin and respectively a cyan colorant, a magenta colorant and a yellow colorant. Conventional colorants for colour toners are described, for example, in U.S. Pat. Nos. 5,102,764; 5,032,483 and EP 0,159,166. Other suitable colorants for use in toner compositions may be selected from one or more of the following and any suitable mixtures thereof: ferrite, magnetite, metallised phthalocyanines (e.g. copper or nickel phthalocyanines, also known as Pc, which are blue), quinacridone, perylene, benzidine, nigrosine, aniline, quinoline, anthraquinone, azo disperse dye (e.g. azo pyridones, also known as AP, which are yellow), benzodifuranones (also known as BDF, e.g. those which are red), metallised lake pigments;. water insoluble or soluble basic dyes (especially the water soluble triphenylmethane dyestuff); xanthenes; monoazo and/or diazo pigments; diarylides; benzimidazolones; isolindolines; isoindolinones; and any mixtures thereof. The toner composition may contain up to 20% colorant, preferably from about 0.1% to about 10%, more preferably from about 0.5% to about 10% and most preferably from about 1% to about 8% by weight of the toner composition.

Colorants for use in toner compositions generally have good heat and light fastness together with low bleed characteristics in the substrate to which they are applied. Preferably the colorant is tinctorially strong, easy to use and is available in a wide variety of derivatives to expand the shade gamut. More preferably the colorant is stable in the processing conditions encountered on formulation, exhibits good stability and fastness when applied to a substrate and has a disposition in colour space which provides a wide and useful gamut of shades from a small number of colorants. Generally the colorant comprises a pigment, however the colorant may also comprise a dye, preferably disperse dyestuffs or solvent-soluble dyestuffs.

The colorant may comprise a magnetic additive (e.g. ferrite and/or magnetite) optionally mixed with a coloured pigment, in which case the colorant is preferably present from 5% to 70% and more preferably from 10% to 50% by weight of the toner composition. Mixtures of carbon black and magnetite are available commercially and those containing from about 1% to 15% are preferred, especially those containing from 2% to 6% carbon black based on the weight of carbon black and magnetite.

Toners comprising a magnetic additive may be useful to print items for use in methods such as magnetic ink character recognition (MICR). MICR is used to machine process large volumes of printed data (e.g. cheques). Chemically produced toners of the present invention which also magnetic are particularly useful in MICR as the controlled particle size leads to sharper printed images and less tendency for the machine to detect incorrectly or fail to read the original image. Thus MICR toners of the present invention reduce the error rate in high volume applications. For certain applications (e.g. cheques) security may also be an issue. The magnetic properties of an item printed using a magnetic toner are not readily detectable to the user. Thus a person who attempts to make an illicit copy will use a conventional (non-magnetic) toner and the magnetic properties of original will not be readily reproduced by conventional copying methods. Therefore MICR can also be used to distinguish between originals and illicit copies.

Coloured toners are of use in colour electroreprography for producing colour images on sheet or film material, especially paper and transparencies (e.g. those made from plastics materials such as polyester and acetate for example for use as overhead transparencies). Particularly useful colour toners are those which exhibit bright and intense colours and produce images with good fastness properties, these are especially useful for laser printing on paper.

It can been seen that it is desirable for toner compositions to comprise particles which can possess readily an electrostatic charge (tribocharge) so they can be attracted to the latent image on the drum to develop the latent image. Toners which readily tribocharge may also have the further advantage of facilitating rapid and more complete removal of any residual toner from the image drum (e.g. by electrostatic repulsion). This may improve image quality (by reducing ghost images from previous copies) and may reduce the cycle time between copies and thus increase the speed of copying.

It has been found that the addition of certain charge control agents (hereinafter known as CCAs) to toner compositions helps the production and stability of tribocharge within the toner. Use of CCAs may also lead to improved image quality when the latent image is transferred to the paper. The mechanism for the action of CCAs is unclear, but the industry continues to seek compounds with improved abilities as CCAs. Properties desired in ideal CCAs; toner compositions to which they are added; and/or the hard copies they produce are well known to those skilled in the art. Such properties might comprise any or all of the following: ability to stabilise larger tribocharge; improved tribocharge distribution and/or uniformity of charge within an individual toner particle and/or across the population of toner particles within a toner composition; reduced cost, reduced toxicity or non-toxicity, greater stability under conditions of use, good compatibility with the binder resin in a toner, improved image resolution, greater speed of image production, reduction in print bleed in the hard copy and/or improved colorant properties.

CCAs may be coloured or substantially colourless. Coloured CCAs have utility as the colorant in the toner for example as dyes or pigments depending on the substrate in which they are used. Colourless CCAs have particular utility in non-black coloured toners (such as for colours which have weak shades) where adding colourless CCAs would not substantially alter the colour of the toner to which they are added.

A CCA may be capable of stabilising a positive electrostatic charge (positive charging) and/or negative electrostatic charge (negative charging). Preferred positive charging CCAs comprise amine derivatives, more preferably alkoxylated amines and/or quaternary ammonium compounds, such as cetyl pyridinium chloride or bromide. Preferred negative charging CCAs comprise metal complexes or salts, preferably comprising an aryl moiety, for example a bis azo aryl moiety, more preferably a 2:1 metal complex or salt of a hydroxynaphthoic acid and/or napthenic acid. Complexes of Zn or Cr may also be effective colourless negative charging CCAs (e.g. di tert-butyl salicylate complexes). CCAs may also comprise suitable electron donating dyes (e.g. nigrosine).

The substituents on a CCA may be selected to improve the compatibility of the CCA with the toner resins with which they are formulated. Thus, the size and length of the substituents may be selected to optimise the physical entanglement or interlocation with the resin or they may contain reactive entities capable of chemically reacting with the resin.

The amount of CCA in the toner is preferably at least about 0.1%, more preferably at least about 0.5% and most preferably at least about 1% by weight of the toner. The amount of CCA in the toner is desirably up to about 12%, preferably up to about 10% more preferably up to about 5% and especially up to about 3% by weight of the toner. Preferably toners comprise suitable agents to control particle flow such as one or more of the following: alumina, silica, benzoguanine-formaldehyde resin, hydroxyapatite, fluroresin, acrylic polymer beads, titania and/or any suitable mixtures thereof.

It will be understood that one or more of ingredient(s) listed herein may be added to the toner compositions of the present invention to serve more than one function. For example magnetite may act as both colorant and magnetic material.

The invention is now further illustrated by the following non-limiting example in which all references to amounts (such as w/w) are to percentages by mass of ingredient to the total mass of the composition to which they are added unless indicated to the contrary.

EXAMPLE 1

(a) Aqueous Pigment Dispersion

A dispersion of HELIOGEN BLUE™ L7080 (Pigment Blue 15:3, BASF) in water (27.3% solids) was made in a similar manner to the dispersion made in Example 1a) above, using an Eiger bead mill, and the dispersants AKYPO™ RLM100 (10% w/w on the pigment, available commercially from Kao Corporation) and SOLSPERSE™ 27000 (10% w/w on the pigment).

(b) Latex

An hydroxy functional polymer latex was made by emulsion polymerisation, the polymer being made from styrene (82.5%), acrylic ester monomers (15.2%) and 2-hydroxyethyl methacrylate (2.5%). Ammonium persulphate (0.5% w/w of monomers) was used as the initiator and a mixture of thiol chain transfer agents (2.5%) used. The surfactant used in the polymerisation was AKYPO™ RLM100 (3% w/w of monomers). The latex had a solids level of 40%. The Tg of the polymer was 61° C., and a GPC analysis against polystyrene standards determined its Mn as 7,500 and Mw as 23,700.

(c1) Mixing the Dispersions

The latex (677 g), the pigment dispersion (52.2 g) and water (1050 g) were mixed in a stirred tank and heated to 57° C. The stirring speed was 550 rpm. The mixture was then pumped using a peristaltic pump from the tank through a flow cell equipped with an Ultra Turrax T50 high shear mixer operating at 10,000 rpm, and back into the stirred tank.

(c2) Inducing Association

During the circulation a 2% solution of sulphuric acid (120 g) was added over 12 minutes close to the high shear head. The final pH of the associated mixture was 2.1. After 3 minutes further circulation the high shear mixing was stopped and the associated material present in the flow cell pumped back into the stirred tank.

(c3) Cluster Growth

The temperature of the mixture in the tank from step (c2) was raised to 66° C. and the mixture stirred for one hour. The pH was then adjusted to 7.9 with the addition of a 1% solution of sodium hydroxide in water, and the mixture stirred for a further 5 minutes.

(d) Fusion

The temperature of the mixture from (c3) was raised to 92° C. and maintained there for two hours, before cooling to room temperature. Sodium dodecylbenzenesulphonate (2% w/w of toner, added as a 10% solution in water) was then added to a small sample. The mixture was heated at 110° C. for 2 hours under pressure and the sample was subjected to continuous agitation. The resulting blue toner particles had a smooth but non-spherical appearance. Analysis with the COULTER COUNTER™ showed a mean volume particle size of 7.2 $\mu$m, with a GSD of 1.34. A separate sample was mixed with 2% sodium dodecylbenzenesulphonate as above and fused at 120° C. under pressure for 30 minutes. The resulting toner was spherical in shape. Analysis with the COULTER COUNTER™ showed a mean volume particle size of 7.0 µm, with a GSD of 1.30.

EXAMPLE 2

(a) Aqueous Pigment Dispersion

A dispersion of MONOLITE™ Rubine 3B (Pigment Red 122, Zeneca) in water (24.6% solids) was made in a similar manner to Example 1a) above, using an Eiger bead mill, and the dispersants AKYPO™ RLM100 (10% w/w of pigment) and SOLSPERSE™ 27000 (10% w/w/ of pigment).

(b) Latex

The latex was the same as that used in Example 1

(c1) Mixing the Dispersions

The latex (451 g), the pigment dispersion (38.6 g) and water (1310 g) were mixed in a stirred tank and heated to 66° C. The stirring speed was 510 rpm. The mixture was then pumped using a peristaltic pump from the tank through a flow cell equipped with an Ultra Turrax T50 high shear mixer operating at 10,000 rpm, and back into the stirred tank.

(c2) Inducing Association

During the circulation a 2% solution of sulphuric acid (85 g) was added over 10 minutes into the stirred tank. The final pH of the associated mixture was 2.1. The high shear mixing was stopped and the associated material present in the flow cell pumped back into the stirred tank.

(c3) Cluster Growth

The mixture was stirred at 66° C. for one hour, and the pH was then adjusted to 7.7 with the addition of a 1% solution of sodium hydroxide in water.

(d) Fusion

The temperature of the mixture from (c3) was raised to 92° C. and maintained there for two hours, before cooling to room temperature. To a small sample was then added sodium dodecylbenzenesulphonate (2% w/w of toner, added as a 10% solution in water). The mixture was heated at 120° C. for 30 minutes under pressure and the sample was subjected to continuous agitation. The resulting magenta toner particles had a smooth but non-spherical appearance. Analysis with the COULTER COUNTER™ showed a mean volume particle size of 8.6 µm, with a GSD of 1.22.

EXAMPLE 3

(a) Aqueous Pigment Dispersion

A dispersion of Pigment Yellow 3G (the pigment Yellow 17 available commercially from Tennants) in water (25.7% solids) was made in a similar manner to Example (1a) above, using an Eiger bead mill, and the dispersants AKYPO™ RLM100 (10% w/w of pigment) and SOLSPERSE™ 27000 (10% w/w of pigment).

(b) Latex

The latex was the same as that used in Examples 1 and 2.

(c1) Mixing the Dispersions

The latex (890 g), the pigment dispersion (73 g) and water (1386 g) were mixed in a stirred tank and heated to 66° C.

(c2) Inducing Association

The mixture was then pumped using a peristaltic pump from the tank through a flow cell equipped with an Ultra Turrax T50 high shear mixer operating at 10,000 rpm, and into a separate stirred tank. Simultaneously with this a 2% solution of sulphuric acid (150 g) was injected over 3.5 minutes into the flow cell, close to the high shear head, to mix with the latex and pigment mixture.

(c3) Cluster Growth

The associated mixture was then stirred at 66° C. for one hour and then sodium dodecylbenzenesulphonate (5% w/w of toner, added as a 10% solution in water) was added.

(d) Fusion

The temperature was then raised to approximately 100° C. and maintained at this temperature for 6 hours, before cooling to room temperature. The resulting yellow toner particles had a smooth but non-spherical appearance. Analysis with the COULTER COUNTER™ showed a mean volume particle size of 6.4 µm, with a GSD of 1.25.

EXAMPLE 4

(a) Aqueous Pigment Dispersion

A dispersion of HELIOGEN BLUE™ L7080 (Pigment Blue 15:3 from BASF) in water (24.2% solids) was made in a similar manner to the above, using an Eiger bead mill, and the dispersants AKYPO™ RLM100 (10% w/w of pigment) and SOLSPERSE™ 27000 (10% w/w of pigment).

(b) Latex

The latex was the same as that used in Examples 1, 2 and 3.

(c1) Mixing the Dispersions

The latex (891 g), the pigment dispersion (77.5 g) and water (1382 g) were mixed in a stirred tank and heated to 62° C.

(c2) Inducing Association

The mixture was then pumped using a peristaltic pump from the tank through a flow cell equipped with an ULTRO TURRAX T50 high shear mixer operating at 10,000 rpm, and into a separate stirred tank. Simultaneously with this a 2% solution of sulphuric acid (150 g) was injected over 3.5 minutes into the flow cell, close to the high shear head, to mix with the latex and pigment mixture.

(c3) Cluster Growth

The associated mixture was stirred at 550 rpm and the temperature raised to 68° C. After one hour the pH was raised to 9 with the addition of sodium hydroxide solution.

(d) Fusion

The temperature of the mixture from step 9c3) was raised to 100° C. and stirred for 4 hours. The dispersion was then cooled and transferred to a stirred pressure vessel and the temperature raised to 120° C. The dispersion was stirred at this temperature for one hour, before cooling to room temperature. After 30 minutes the resulting blue toner particles had a smooth, but irregular appearance. Analysis with the COULTER COUNTER™ showed a mean volume particle size of 7.4 µm, with a GSD of 1.25. After one hour the toner particles were nearly spherical, with a mean volume particle size of 7.4 µm and a GSD of 1.26.

What is claimed is:

1. A process for producing a particulate composition comprising the steps of:

(a) forming a first dispersion comprising first particles stabilised in a first fluid;

(b) forming a second dispersion comprising second particles which comprise hydroxy groups directly bonded to the surface by forming part of a hydroxy functionalised copolymer, which comprises from 0.1 wt % to 10 wt % of a hydroxy-functional monomer from which copolymer the particles are formed which particles do not contain acidic or basic polar groups and which are stabilised in a fluid, miscible with the first fluid;

(c) mixing the first and second dispersions together;

(d) inducing association between the dispersed particles to form clusters; and (e) binding together the particles within the clusters by raising their temperature to effect fusion.

2. A process as claimed in claim 1 in which the first particles are pigmentary particles.

3. A process as claimed in claim 1 or 2 in which step (e) takes place whilst the particles are in dispersion in a fluid.

4. A process as claimed in claim 2 in which the particulate composition is an electroreprographically effective toner and/or developer composition.

5. An electroreprographic toner composition comprising particles produced by a process as claimed in claim 1 in which 80% of the toner particles have a diameter in the range 2 to 20 micrometers.

6. A process for producing a coloured toner composition which comprises:

(a) forming an aqueous dispersion comprising pigmentary particles;

(b) forming a second aqueous dispersion comprising polymer particles, the polymer comprising hydroxy functional groups;

(c) mixing the first and second dispersions to obtain a substantially homogeneous mixture in the absence of substantial association;

(d) forming dusters by inducing the particles to associate;

(e) including growth of the clusters into dispersed matrices of loosely associated dusters;

(f) heating the mixture from step (e) at a temperature above the glass transition temperature of the constituent hydroxy functional polymer to fuse together the clustered particles to form internally coalesced particles of a coloured toner; and (g) collecting the coloured particulate toner obtained in step (f) and producing optionally after washing, drying and/or blending wit other suitable ingredients, a coloured toner composition.

\* \* \* \* \*